(12) United States Patent
Buhl et al.

(10) Patent No.: US 7,771,136 B2
(45) Date of Patent: Aug. 10, 2010

(54) BALL AND SOCKET JOINT

(75) Inventors: Manfred Buhl, Bissendorf (DE); Ralf Kunze, Bad Essen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 45 days.

(21) Appl. No.: 11/917,566

(22) PCT Filed: Jun. 16, 2006

(86) PCT No.: PCT/DE2006/001036
§ 371 (c)(1),
(2), (4) Date: Dec. 14, 2007

(87) PCT Pub. No.: WO2006/133693
PCT Pub. Date: Dec. 21, 2006

(65) Prior Publication Data
US 2008/0193206 A1 Aug. 14, 2008

(30) Foreign Application Priority Data
Jun. 17, 2005 (DE) .................. 10 2005 028 515

(51) Int. Cl.
*F16C 11/06* (2006.01)
(52) U.S. Cl. .................. 403/142; 403/77; 403/143
(58) Field of Classification Search .................. 403/76, 403/77, 141, 142, 143
See application file for complete search history.

(56) References Cited
U.S. PATENT DOCUMENTS

| | | | | |
|---|---|---|---|---|
| 2,845,290 A | * | 7/1958 | Latzen | 403/77 |
| 3,679,236 A | * | 7/1972 | Warshawsky | 403/138 |
| 3,950,006 A | * | 4/1976 | Wood, Jr. | 403/133 |
| 4,725,159 A | * | 2/1988 | Wood, Jr. | 403/143 |
| 4,767,231 A | * | 8/1988 | Wallis | 403/76 |
| 6,030,141 A | * | 2/2000 | Lieber et al. | 403/135 |
| 6,343,889 B1 | | 2/2002 | Hendricks et al. | |
| 2002/0184768 A1 | | 12/2002 | Michioka et al. | |

FOREIGN PATENT DOCUMENTS

| | | |
|---|---|---|
| DE | 73 30 211 U | 11/1973 |
| DE | 44 45 251 A1 | 1/1996 |
| DE | 198 00 614 A1 | 7/1999 |
| EP | 0 080 262 A1 | 6/1983 |
| FR | 2 691 490 A1 | 11/1993 |

* cited by examiner

Primary Examiner—Michael P Ferguson
(74) Attorney, Agent, or Firm—McGlew and Tuttle, P.C.

(57) ABSTRACT

A ball and socket joint is provided, for example, for an axle system of a motor vehicle. The joint has an essentially ring-shaped or pot-shaped joint housing (2). The ball (7) of a ball pivot (1) is received in the interior space of the joint housing (2) in a slidingly movable manner. The joint housing (2) includes a ball pivot-side and a housing cover-side housing half (4, 5). The two housing halves (4, 5) have an essentially circumferential axial stop (9). Based on the axial stop (9), the housing halves (4, 5) can be brought into contact with one another in the axial direction in an exactly defined manner. The reproducibility of tolerances in manufacture can be carefully controlled allowing manufacture at a low cost. The specific load-bearing capacity of the ball and socket joint can be increased or the dimensions of the ball and socket joint can be reduced.

17 Claims, 1 Drawing Sheet

BALL AND SOCKET JOINT

CROSS REFERENCE TO RELATED APPLICATIONS

This application is a United States National Phase application of International Application PCT/DE 2006/001036 and claims the benefit of priority under 35 U.S.C. §119 of German Patent Application DE 10 2005 028 515.5 filed Jun. 17, 2007, the entire contents of which are incorporated herein by reference.

FIELD OF THE INVENTION

The present invention pertains to a ball and socket joint, for example, for an axle system or a wheel suspension of a motor vehicle.

BACKGROUND OF THE INVENTION

Ball and socket joints of the type mentioned in the introduction are used, for example, but by no means exclusively, on the chassis or in the area of the wheel suspension or steering of motor vehicles, for example, as a support joint or as a guide joint.

Ball and socket joints of this type according to the state of the art usually have a one-part housing as well as a bearing shell arranged therein, which is usually made of a polymer material. To fix the bearing shell in the housing, an axially front-side area of the housing is usually deformed such that the bearing shell and the ball are pressed or enclosed in the joint housing under a certain prestress.

Other prior-art designs of ball and socket joints of this class likewise have a one-part joint housing, and a two-part bearing shell, which likewise consists usually of a plastic, is arranged in the joint housing. The joint housing is closed and the bearing shell is fixed in the housing in a similar manner as in the prior-art ball and socket joints with a one-part bearing shell.

However, the problem arises during the manufacture of such prior-art ball and socket joints that the position of the ball shell in the joint housing and especially the prestress ratios between the bearing shell and the joint ball cannot be optimally controlled and are not reproducible during the closing of the housing, which is brought about, as described, in general, by deforming a partial area of the joint housing.

The value of the prestressing forces in the ball and socket joint—and the functionally important characteristic of the tilting moment necessary for the motion of the joint ball in the ball shell—thus depend essentially on the care with which the deformation process is carried out in the prior-art ball and socket joints. The consequence is therefore a correspondingly broad dispersion of the tilting moment values in the ball and socket joints known from the state of the art. However, such tolerances of the tilting moment values are increasingly not accepted, especially in case of demanding applications.

SUMMARY OF THE INVENTION

Against this background, the object of the present invention is to provide a ball and socket joint, with which the drawbacks of the state of the art can be overcome. In particular, the ball and socket joint shall have the smallest possible tolerance, which can be reliably controlled by the technology, especially in respect to the tilting moment.

The ball and socket joint according to the present invention comprises, in a manner known per se, a joint housing with a usually essentially pot-shaped or cylindrical interior space, the joint ball of the ball and socket joint being accommodated in the interior space of the joint housing in a slidingly movable manner.

However, the ball and socket joint is characterized according to the present invention in that the joint housing comprises—relative to the longitudinal axis of the ball pivot in its neutral position—a ball pivot-side housing half as well as a housing cover-side housing half. The two housing halves can be brought into contact with one another in an exactly defined manner in the axial direction of the joint housing by means of an essentially annular circumferential stop. The term "housing halves" means, in the general sense, that the joint housing has a two-part design in the characteristic manner being claimed, but the "housing halves" do not have to have the same size or shape by any means.

In other words, this means that an absolutely exact relative positioning of the two housing halves takes place in the axial direction of the joint housing during the mounting of the ball and socket joint according to the present invention based on the stops which correspond to each other in terms of shape and are arranged on the two housing halves each. However, contrary to the state of the art, an exactly identical internal volume of the joint housing is also always guaranteed, which in turn leads to exactly reproducible prestress ratios between the joint housing and the joint ball or between a bearing shell arranged in the joint housing and the joint ball.

Furthermore, the housing halves preferably also have a likewise essentially circumferential radial stop each. The two radial stops, which correspond to each other in terms of shape, ensure that the housing halves are in contact with one another in the radial direction in an exactly defined and centered manner.

Whether the ball and socket joint has a bearing shell of its own, the material of which this bearing shell is made and the design of the bearing shell, if there is any, or whether an optionally present bearing shell is of a one-part or two-part design are at first irrelevant for the embodiment of the present invention.

However, according to an especially preferred embodiment, at least one housing half, preferably both housing halves, form at the same time directly a part of the bearing shell each for the joint ball. In other words, this means that one half or both halves of the joint housing—without a bearing shell inserted specifically in between—at the same time represent the bearing surface for the joint ball at the same time on their inner side.

This eliminates the need to additionally provide a separate bearing shell, as a result of which efforts and corresponding costs can already be saved. Furthermore, it is possible in this manner to achieve an even greater reduction of the tolerances of the dimensions and especially of the prestressing forces and tilting moments of the ball and socket joint which are related thereto.

Thus, since no additional bearing shell, which usually consists of a polymer material with a comparatively low load-bearing capacity according to the state of the art also because of the need for tolerance compensation, is necessary any longer between the joint ball and the joint housing, it is, furthermore, also possible to substantially increase the permissible surface pressure between the metallic pair comprising the joint ball and the joint housing. Either an increase in loadability at equal dimensions or a reduction of the dimensions and of the weight of the ball and socket joint can be derived from this. All this is advantageously favorable for improving the cost-benefit ratio of the ball and socket joint.

The problems frequently occurring in practice in the state of the art with the correct fixing of the bearing shell in the ball and socket joint while at the same time maintaining the intended prestressing forces between the bearing shell and the joint ball are also completely eliminated by a ball and socket joint in which the housing halves at the same time represent the bearing shell directly.

The housing half forming the bearing shell or the housing halves forming the two bearing shells especially preferably have a surface hardening in the area of their contact surfaces with the joint ball. Based on the surface hardening, which is preferably formed in the form of an inductive hardening, the permissible surface pressures between the joint housing and the joint ball can be substantially increased even further. The size of the ball and socket joint can thus be further reduced while the load-bearing capacity remains the same, or the nominal load of the ball and socket joint can be increased without any change in dimensions. Moreover, an even further reduction of the coefficients of friction, a further reduction of the dispersion of the tilting moments of the ball and socket joint as well as a considerable prolongation of the service life of the ball and socket joint can be achieved in this manner.

According to another, especially preferred embodiment of the present invention, the interior space of the joint housing has a recess extending circumferentially in a ring-shaped pattern. A ring element made of an elastic polymer material is arranged in the circumferential recess, the ring element preferably being under a defined prestress.

This embodiment is advantageous because an especially exact definition of the desired prestress and of the desired moment of friction and tilting moment of the ball and socket joint can be achieved in this manner. Values for shock and vibration absorption, which values can be exactly specified, can also be set in this manner in a ball and socket joint, and the ring element can be additionally used as a wear compensation for the expectable wear on the bearing surfaces of the joint ball and the joint housing.

The present invention is embodied independently from the design of the connection between the two housing halves as long as the reliable cohesion of the housing halves is guaranteed at the loads to be expected to occur during the operation of the ball and socket joint.

However, provisions are made according to a preferred embodiment of the present invention for the two housing halves to have a corresponding pairing of an internal thread and an external thread. Simple, accurate and reliable mounting of the two housing halves can thus be carried out by means of a screw connection after the joint ball has been arranged in the interior space formed by the two housing halves. Wrench surfaces, via which the torque necessary for screwing can be transmitted to the housing halves, are preferably arranged on both housing halves.

According to an alternative embodiment of the present invention, one of the housing halves has an essentially circumferential undercut. The other housing half has, in the assembled state of the ball and socket joint, a likewise essentially circumferential projection. The projection of the second housing half extends behind the undercut of the first housing half in the completely assembled ball and socket joint such that the two circumferential stops of the housing halves are pressed firmly onto each other.

The circumferential projection can be prepared, for example, by pressing, end rolling or rolling the front side of one housing half.

The connection between the two housing halves can be prepared in this manner especially rapidly and hence at a low cost, while a mutually exact positioning of the housing halves continues to be guaranteed at the same time thanks to the stops according to the present invention of the two housing halves.

According to another, likewise especially preferred embodiment, the ball and socket joint is an axial joint. The cover-side housing half i.e., the housing half of the joint housing facing away from the pin opening, is preferably made here in one piece with a connection element. The connection element may be especially, but by no means exclusively, a female thread made integrally in one piece or a threaded bolt made integrally in one piece. The ball and socket joint is embodied in this manner as an axial joint with an especially small number of components, which in turn is favorable for the low-cost production and mounting as well as for the reliable operation of the ball and socket joint.

The present invention will be explained in more detail below on the basis of drawings representing exemplary embodiments only. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
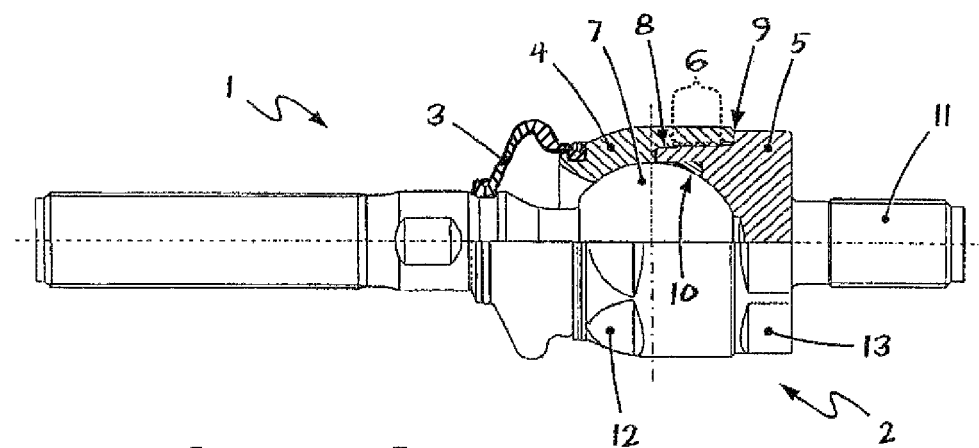
FIG. 1 is a schematic, partially cut-away view of an embodiment of a ball and socket joint according to the present invention.

Referring to the drawings in particular, FIG. 1 shows a schematic, partially cut-away view of a longitudinal section of a first embodiment of a ball and socket joint according to the present invention.

It is recognized at first that the ball and socket joint according to FIG. 1 is an axial joint, which has a ball pivot 1 as well as a joint housing 2 and, furthermore, a sealing bellows 3. However, the joint housing 2 has a two-part design and comprises the two housing halves 4 and 5.

The two housing halves 4 and 5 are screwed together by means of a thread 6 and form in this manner not only the joint housing itself, but at the same time also the bearing surface proper for the joint ball 7. An exact and reproducible relative positioning of the two housing halves 4 and 5 is guaranteed by a radial stop at 8 as well as an axial stop or by axial centering by means of a fit at 9.

The ball and socket joint comprises, furthermore, an elastic ring element 10, which is made of an elastomer material in this exemplary embodiment and is arranged in a circumferential annular groove of the housing half 5 under a defined prestress. Thanks to the ring element 10, the desired prestress of the ball and socket joint and the intended coefficient of friction and tilting moment during the motion of the ball and socket joint can be set by the design especially exactly and with very high reproducibility.

The intended values for shock and vibration absorption of the ball and socket joint can also be specified and set exactly in this manner, and, furthermore, the ring element can be used to compensate the wear based on the wear of the bearing surface of the joint ball and the joint housing, which develops over time.

FIG. 1 shows, furthermore, that the housing half 5, which is the right-hand housing half in the drawing, has a threaded bolt 11, which is made integrally in one piece and by which the axial joint being shown can be reliably connected to adjacent components. Finally, it can be recognized that both housing halves 4 and 5 are provided with wrench surfaces 12, 13, which are used to simply and reliably introduce the torque necessary to screw together the two housing halves 4 and 5 during the mounting of the ball and socket joint.

Figure 2:
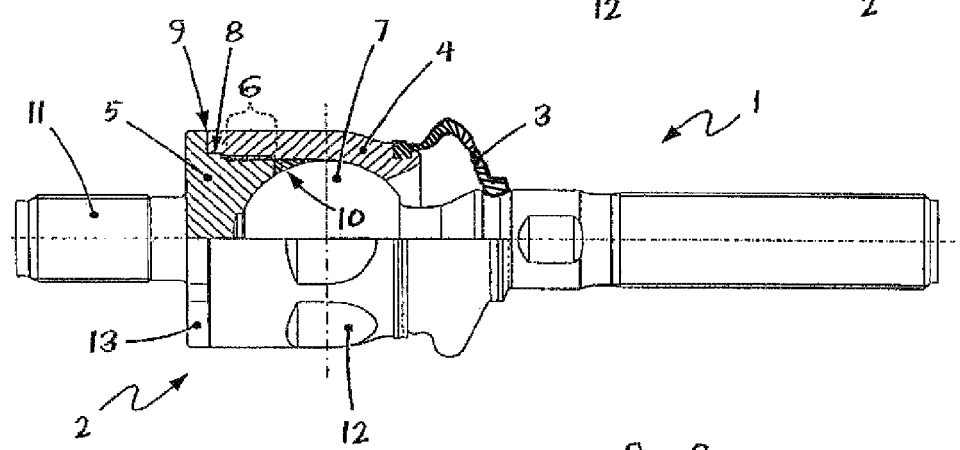
FIG. 2 is a schematic, partially cut-away view corresponding to FIG. 1 of another embodiment of a ball and socket joint according to the present invention.

The ball and socket joint according to FIG. 2 differs from the embodiment according to FIG. 1 essentially by the position of the radial stop 8 and the annular groove or ring element 10. Contrary to FIG. 1, the radial stop 8 in the ball and socket joint according to FIG. 2 is arranged in the axial end area of the housing half 4. The annular groove for receiving the elastic ring element 10, which is formed by a recess in the housing half 5 in the ball and socket joint according to FIG. 1, is formed in the ball and socket joint according to FIG. 2 only by the cooperation of the two housing halves 4 and 5.

Figure 3:
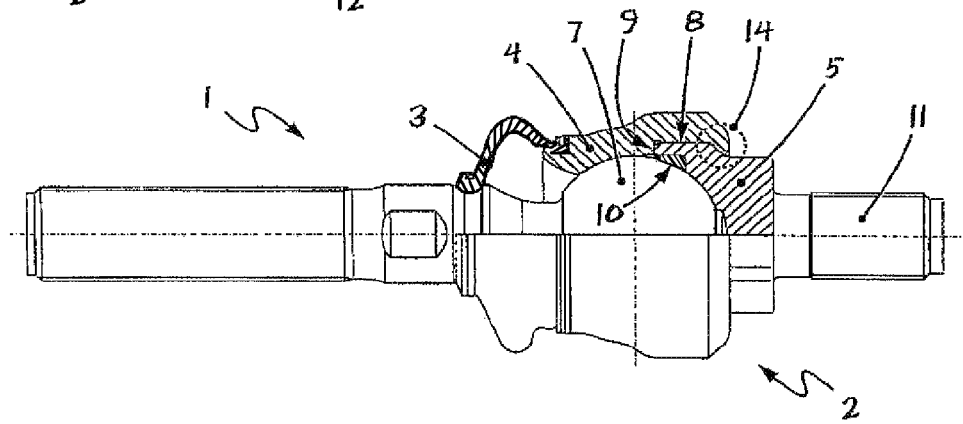
FIG. 3 is a schematic, partially cut-away view corresponding to FIGS. 1 and 2 of a third embodiment of a ball and socket joint according to the present invention.

Another embodiment of a ball and socket joint according to the present invention, again in the form of an axial joint, is shown in FIG. 3. The essential difference between the embodiments according to FIGS. 1 and 2 and the embodiment according to FIG. 3 is that the connection of the two housing halves 4 and 5 in the ball and socket joint according to FIG. 3 is not brought about by means of a screw connection but by plastic deformation of the pin-side housing half 4.

The deformation, which can be produced, for example, by means of pressing or end rolling, takes place here in the front-side area of the pin-side housing half 4, which said area is designated by reference number 14. A projection, which extends circumferentially in a ring-shaped pattern and extends behind a likewise circumferential undercut of the housing half 5 at reference number 14 in a positive-locking manner such that the two housing halves 4 and 5 are nondetachably connected to one another, is formed by this deformation in the area of the front side of the housing half 4. Both the axial stops 9 and the radial stops or fits 8 of the two housing halves 4 and 5 are now pressed firmly onto each other, so that an exactly defined relative position of the two housing halves 4 and 5 is guaranteed.

Figure 4:
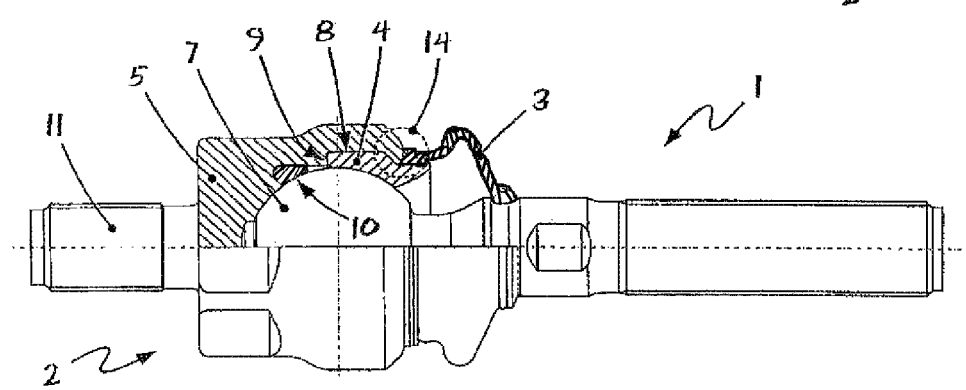
FIG. 4 is a schematic, partially cut-away view corresponding to FIGS. 1 through 3 of a fourth embodiment of a ball and socket joint according to the present invention.

Finally, FIG. 4 shows a fourth embodiment of a ball and socket joint according to the present invention, which is likewise designed again as an axial joint. The essential features of the axial joint according to FIG. 4 correspond to those of the axial joint according to FIG. 3, but the axial joint according to FIG. 4 differs from that according to FIG. 3 in that, unlike in the axial joint according to FIG. 3, the pin-side housing half 4 does not extend around the cover-side housing half 5 at reference number 14, but, conversely, the pin-side housing half 4 is rather surrounded here by the cover-side housing half 5. Accordingly, the pressing 14 takes place in the axial joint according to FIG. 4 by deformation of the cover-side housing half 5 rather than by deformation of the pin-side housing half 4, the housing half 5 carrying, in turn, directly the threaded bolt 11 for reliable connection to adjacent components.

The ball and socket joint according to FIG. 4 can have an especially compact and robust design; furthermore, there additionally arise design simplifications and hence potential cost savings, especially concerning the design of the housing-side fastening groove for the sealing bellows 3.

Thus, it becomes clear as a result that thanks to the present invention, a ball and socket joint is provided, which can be controlled especially easily in terms of manufacturing technology and therefore can be produced at the same time at a low cost while quality continues to be high. The ball and socket joint according to the present invention is characterized, moreover, by a considerable potential for increasing the specific load-bearing capacity or optionally for reducing the dimensions. Thus, the increasing quality requirements of the market can be met with the ball and socket joint according to the present invention without appreciable manufacturing cost increases being associated herewith.

Thus, the present invention makes an important contribution to the qualitative improvement of ball and socket joints and shows its potential especially in the use of ball and socket joints as guide joints in the area of demanding axle and steering systems as well as wheel suspensions on the motor vehicle.

While specific embodiments of the invention have been shown and described in detail to illustrate the application of the principles of the invention, it will be understood that the invention may be embodied otherwise without departing from such principles.

The invention claimed is:

1. A ball and socket joint for an axle system of a motor vehicle, the ball and socket joint comprising:
  a joint housing comprising a pin-side housing half and a cover-side housing half, said pin-side housing half comprising a bearing shell surface defining a cavity and having a pin opening at one axial end of said pin-side housing half and a ball opening at the other axial end of said pin-side housing half, said cover-side housing half comprising a bearing shell surface defining a cavity and having a ball opening at an axial end of said cover-side housing half, one of said housing halves comprising a circumferential axial stop disposed on an outer surface of said one housing half, the other of said housing halves comprising a circumferential axial stop disposed within said cavity of said other housing half and defining a circumferential projection, said one housing half axially engaging said other housing half such that said axial stops abut each other and said circumferential projection interlockably engages said outer surface of said one housing half to define an interior space of said joint housing;
  a ball pivot comprising a joint ball pivotably engaging the bearing shell surfaces of said housing halves within said interior space and a ball pin extending through the pin opening of said pin-side housing half; and
  a ring element made of an elastic material received within an annular recess formed in one of said bearing shell surfaces, said housing halves being connected to each other such that said housing halves exert a clamping force on said ring element, wherein said ring element is under a defined prestress via said clamping force.

2. A ball and socket joint in accordance with claim 1, wherein said housing halves each have an essentially circumferential radial stop, by which said housing halves can be brought into contact with one another in the radial direction in an exactly centered manner.

3. A ball and socket joint in accordance with claim 1, wherein said bearing shell surfaces have a surface hardening.

4. A ball and socket joint in accordance with claim 1, wherein said one housing half has an essentially circumferential undercut on said outer surface, wherein said circumferential projection of the other housing half extends behind said undercut in a positive-locking manner.

5. A ball and socket joint in accordance with claim 1, wherein said ball and socket joint is an axial joint.

6. A ball and socket joint in accordance with claim 5, wherein said cover-side housing half is made in one piece with a connection element.

7. A ball and socket joint in accordance with claim 1, wherein said joint ball has a ring element engaging surface, each of said housing halves being connected to one another to generate said clamping force on said ring element such that said ring element applies a ring element force on said ring element engaging surface, said ring element engaging surface not being in contact with said housing halves.

8. A ball and socket joint for an axle system of a motor vehicle, the ball and socket joint comprising:
   a joint housing comprising a pin-side housing half and a cover-side housing half, said pin-side housing half comprising a bearing shell surface defining a cavity and having a pin opening at one axial end of said pin-side housing half and a ball opening at the other axial end of said pin-side housing half, said cover-side housing half comprising a bearing shell surface defining a cavity and having a ball opening at an axial end of said cover-side housing half, one of said housing halves comprising a circumferential axial stop disposed on an outer surface of said one housing half, the other of said housing halves comprising a circumferential axial stop disposed within said cavity of said other housing half and defining a circumferential projection, said one housing half axially engaging said other housing half such that said axial stops abut each other and said circumferential projection interlockably engages said outer surface of said one housing half to define an interior space of said joint housing;
   a ball pivot comprising a joint ball pivotably engaging the bearing shell surfaces of said housing halves within said interior space and a ball pin extending through the pin opening of said pin-side housing half; and
   a ring element made of an elastic material received within an annular recess formed in one of said bearing shell surfaces such that a joint housing force is applied on said ring element, wherein said joint housing force is generated by the connection of said cover-side housing half to said pin-side housing half, wherein said ring element applies a ring element force on said joint ball via said joint housing force, said annular recess extending circumferentially about said joint ball.

9. A motor vehicle ball and socket joint in accordance with claim 8, wherein said housing halves each have an essentially circumferential radial stop, by which said housing halves are brought into contact with one another in the radial direction in an exactly centered manner.

10. A motor vehicle ball and socket joint in accordance with claim 8, wherein said housing halves apply said joint housing force on said ring element such that said ring element applies said ring element force on a ring element engaging surface of said joint ball, said ring element engaging surface not being in contact with said housing halves.

11. A motor vehicle ball and socket joint in accordance with claim 10, wherein said joint ball has a defined center point, said ring element being axially displaced with respect to said center point of said joint ball.

12. A motor vehicle ball and socket joint in accordance with claim 11, wherein said ring element is completely arranged in said cover-side housing half.

13. A motor vehicle ball and socket joint in accordance with claim 10, wherein said bearing shell surfaces have a surface hardening.

14. A motor vehicle ball and socket joint in accordance with claim 8, wherein said one housing half has an essentially circumferential undercut on said outer surface, wherein said circumferential projection of said other housing hald extends behind said undercut in a positive-locking manner.

15. A motor vehicle ball and socket joint in accordance with claim 14, wherein said ball and socket joint is an axial joint and said cover-side housing half is made in one piece with a connection element.

16. A ball and socket joint for an axle system of a motor vehicle, the ball and socket joint comprising:
   a joint housing comprising a pin-side housing half and a cover-side housing half, said pin-side housing half comprising a bearing shell surface defining a cavity and having a pin opening at one axial end of said pin-side housing half and a ball opening at the other axial end of said pin-side housing half, said cover-side housing half comprising a bearing shell surface defining a cavity and having a ball opening at an axial end of said cover-side housing half one of said housing halves comprising a circumferential axial stop disposed on an outer surface of said one housing half, the other of said housing halves comprising a circumferential axial stop disposed within said cavity of said other housing half and defining a circumferential projection, said one housing half axially engaging said other housing half such that said axial stops abut each other and said circumferential projection interlockably engages said outer surface of said one housing half to define an interior space of said joint housing;
   a ball pivot comprising a joint ball pivotably engaging the bearing shell surfaces of said housing halves within said interior space and a ball pin extending through the pin opening of said pin-side housing half; and
   a ring element made of an elastic polymer material received within an annular recess formed in the bearing shell surface of said cover-side housing half, said housing halves being connected to each other such that said housing halves exert a clamping force on said ring element, wherein said ring element is under a defined prestress via said clamping force, said ring element being axially displaced with respect to a center area of said joint ball.

17. A ball and socket joint for an axle system of a motor vehicle, the ball and socket joint comprising:
   a joint housing comprising a pin-side housing half and a cover-side housing half, said pin-side housing half comprising a bearing shell surface defining a cavity and having a pin opening at one axial end of said pin-side housing half and a ball opening at the other axial end of said pin-side housing half, said cover-side housing half comprising a bearing shell surface defining a cavity and having a ball opening at an axial end of said cover-side housing half, one of said housing halves comprising a circumferential axial stop disposed on an outer surface of said one housing half, the other of said housing halves comprising a circumferential axial stop disposed within said cavity of said other housing half and defining a circumferential projection, said one housing half axially engaging said other housing half such that said axial stops abut each other and said circumferential projection interlockably engages said outer surface of said one housing half to define an interior space of said joint housing;

a ball pivot comprising a joint ball pivotably engaging the bearing shell surfaces of said housing halves within said interior space and a ball pin extending through the pin opening of said pin-side housing half; and a ring element made of an elastic polymer material received within an annular recess formed in one of said bearing shell surfaces, said housing halves being connected to each other such that said housing halves exert a clamping force on said ring element, wherein said ring element is under a defined prestress via said clamping force;

wherein said joint ball has a ring element engaging surface, each of said housing halves being connected to one another to generate said clamping force on said ring element such that said ring element applies a ring element force on said ring element engaging surface, said ring element engaging surface not being in contact with said housing halves.

* * * * *